(No Model.)  2 Sheets—Sheet 1.

S. M. ROYER.
FOLDING BASKET.

No. 594,562.  Patented Nov. 30, 1897.

WITNESSES

INVENTOR
Samuel M. Royer,
by John Wedderburn
Attorney (No Model.) 2 Sheets—Sheet 2.

S. M. ROYER.
FOLDING BASKET.

No. 594,562. Patented Nov. 30, 1897.

WITNESSES

INVENTOR,
Samuel M. Royer,
by John Wedderburn
Attorney

UNITED STATES PATENT OFFICE.

SAMUEL M. ROYER, OF MARTINSBURG, PENNSYLVANIA, ASSIGNOR TO CHARLOTTE ROYER AND OLNEY E. ROYER, OF SAME PLACE.

FOLDING BASKET.

SPECIFICATION forming part of Letters Patent No. 594,562, dated November 30, 1897.

Application filed October 14, 1896. Renewed September 14, 1897. Serial No. 651,680. (No model.)

*To all whom it may concern:*

Be it known that I, SAMUEL M. ROYER, a citizen of the United States, residing at Martinsburg, in the county of Blair and State of Pennsylvania, have invented certain new and useful Improvements in Folding Baskets; and I do hereby declare the following to be a full, clear, and exact description of the invention, such as will enable others skilled in the art to which it appertains to make and use the same.

My invention relates to collapsible or knockdown baskets.

My object is to provide a more simple and cheap basket of the class described which can be quickly and easily folded in compact form when empty, so that it can be carried conveniently, but which can be extended and made into basket form whenever desirable, so that parcels or packages may be readily carried.

Having this object in view, my invention consists of a collapsible or knockdown basket comprising inner and outer pieces of suitable material and peculiar and novel construction, so that they can be either folded into compact or extended into basket form, in connection with a novel device which is adapted to assist in holding the basket in shape when in use and which provides a handle.

The invention still further consists of certain other novel features and combinations appearing more fully hereinafter.

Figure 1:
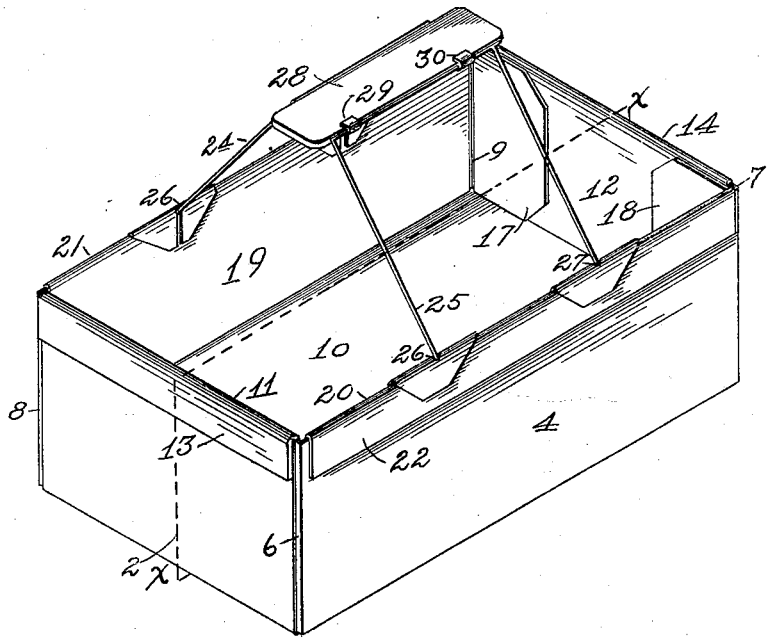
Figure 2:
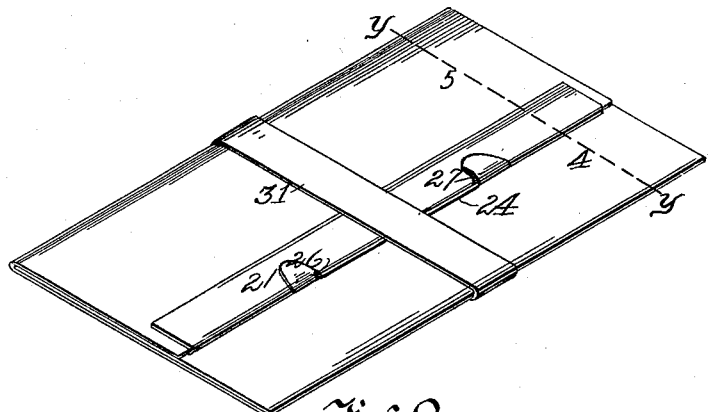
Figure 3:
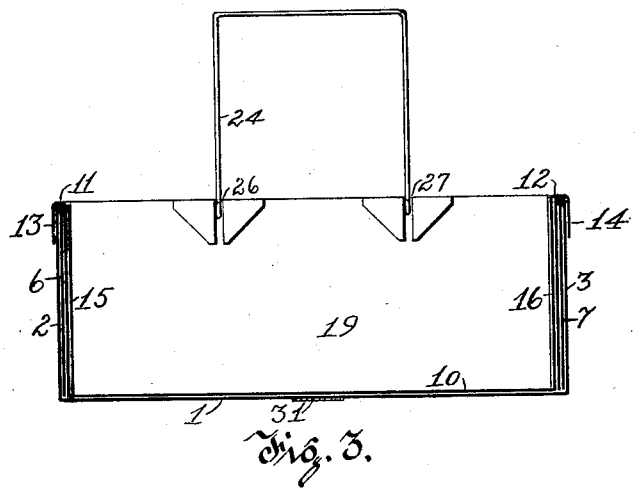
Figure 4:
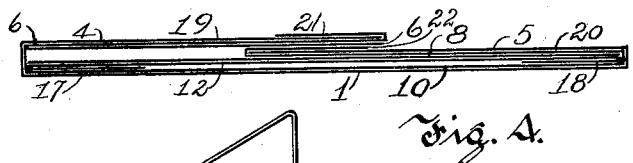
Figure 5:
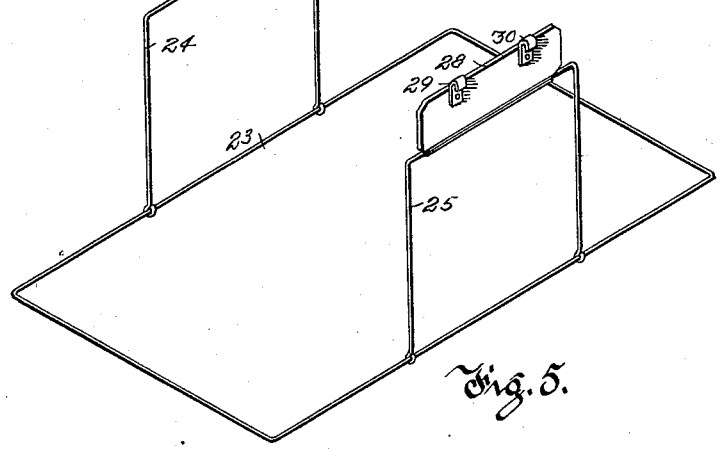

Figure 1 is a perspective view showing my basket in open position. Fig. 2 is a like view showing the basket collapsed. Fig. 3 is a longitudinal sectional portion on the line $x\ x$ of Fig. 1. Fig. 4 is a cross-section on the line $y\ y$ of Fig. 2, and Fig. 5 is a detail perspective view of the handles and the rectangular band of wire to which they are pivoted.

My improved collapsible and knockdown basket comprises, essentially, three parts—outer and inner pieces of novel construction, which constitute the body of the basket, and an improved device for holding said pieces in basket form and which will serve as a handle. These will be described in their order.

The numeral 1 designates the rectangular bottom of the outside piece, and this bottom and its sides and ends are preferably constructed of pasteboard. At opposite ends of the bottom there are end pieces 2 and 3, which are in the form of flaps, so that they can be either folded against the bottom or raised when necessary. There are two side pieces 4 and 5, which are also in the form of flaps, so that they can be folded against the bottom or extended to vertical position. At opposite ends of side piece 4 there are bracing-flaps 6 and 7, while similar flaps 8 and 9 are located at opposite ends of side piece 5. The inside piece of the box-body is also preferably constructed of cardboard, and the numeral 10 designates the rectangular bottom of this piece, which is of slightly smaller size than the bottom of the outside piece of the box. At opposite ends of this bottom there are located end pieces 11 and 12, respectively, which are in the form of flaps and are of slightly greater height than the ends of the outside pieces of the box. The respective ends 11 and 12 are provided with fastening-flaps 13 and 14, which bend over ends 2 and 3 and are suitably glued or fastened thereto, so that the box will have double ends. End 11 is provided on opposite sides with respective bracing-flaps 15 and 16, while end piece 12 is also provided with like flaps 17 and 18. The bottom 10 of the inside piece of the box is provided with integral sides 19 and 20, which are in the form of flaps, and these are each somewhat higher than the sides of the outside piece of the box, and they are provided with respective fastening-flaps 21 and 22, which are connected to the sides of the outside piece by gluing or fastening in any desired manner. It will thus be observed that the sides of the basket are formed double, as well as the ends thereof.

The numeral 23 designates a rectangular band of wire which lies between the double sides and ends of the basket and extends completely around the latter, being adapted for vertical movement in said sides and ends. Two loops of wire of inverted-U shape, 24 and 25, are pivotally connected to band 23 and lie in the double sides of the basket and project up through sets of slots or openings 26 and 27. A handle 28 is hinged to the cross-piece of one of these loops and is provided with hooks 29 and 30, which are adapted for engagement with the cross-piece of the other loop. A suitable elastic band 31 is connected to the outside of the bottom of the basket and is adapted to be wound around the collapsed parts of the basket when the latter is in folded arrangement.

When the basket is in collapsed or knocked-down arrangement, the rectangular band is forced down, so that it will lie against the bottom of the basket, and the sides and ends are folded down in the position shown in Figs. 2 and 4 and are then held in compact form by the elastic band.

When it is desirable that the basket be extended, so that parcels can be carried, the sides and ends are raised to a vertical position, as shown in Figs. 1 and 3, and the bracing-flaps of the ends inserted in the double sides, while the bracing-flaps of the sides are also inserted in the double ends. The loops are next raised, so that the rectangular frame is brought to the top of the sides and ends, whereupon said loops may be inclined toward each other and hooked together by means of the hooks on the handle. When thus arranged, the basket formed will be quite strong and adapted to carry suitable parcels, packages, or other articles, while the handle provides the means for allowing easy transportation.

It is obvious that the invention could be varied in many slight and immaterial ways without departing from its spirit, and it is to be understood, therefore, that I do not limit myself to the precise construction herein shown and described, but consider that I am entitled to all such variations as come within the scope of my invention.

Having now described my invention, what I claim as new, and desire to secure by Letters Patent, is—

1. A knockdown or collapsible basket comprising the combination with a bottom, sides and ends made double and hinged to the bottom and adapted to fold down thereupon, of a band which lies within the double sides and ends, and means for raising and lowering said band.

2. A knockdown or collapsible basket comprising the combination with a bottom, and sides and ends which are double and hinged thereto and adapted to fold down thereupon, of a band which lies in the double sides and ends, and loops pivotally connected to said band and projecting through openings in the double sides, whereby said band may be raised or lowered.

3. A knockdown or collapsible basket comprising the combination with a bottom and foldable sides and ends hinged thereto, said sides and ends being made double, of a band which is located in the sides and ends, wire loops pivoted to said band and projecting through openings in the sides, and a handle connected to one of the loops and having hooks adapted for engagement with the other loop.

4. A collapsible or knockdown basket comprising the combination with a rectangular bottom, double sides and ends hinged to said bottom and adapted to fold down thereupon, bracing-flaps connected to side pieces at opposite ends thereof and adapted for reception in the double ends of the box, bracing-flaps connected to the respective ends of the box and adapted for reception in the sides, a rectangular band which lies in the double sides and ends, loops pivotally connected to said band and projecting through the sides at the tops thereof, and a handle pivotally connected to one of the loops and provided with hooks which are adapted for engagement with the other loop.

In testimony whereof I have signed this specification in the presence of two subscribing witnesses.

SAMUEL M. ROYER.

Witnesses:
R. E. NICODEMUS,
JOHN H. NICODEMUS.